Dec. 26, 1939.  E. G. JOHANSSON ET AL  2,184,840
APPARATUS FOR BY-PASSING SOCKET METERS
Filed March 3, 1939   3 Sheets-Sheet 1
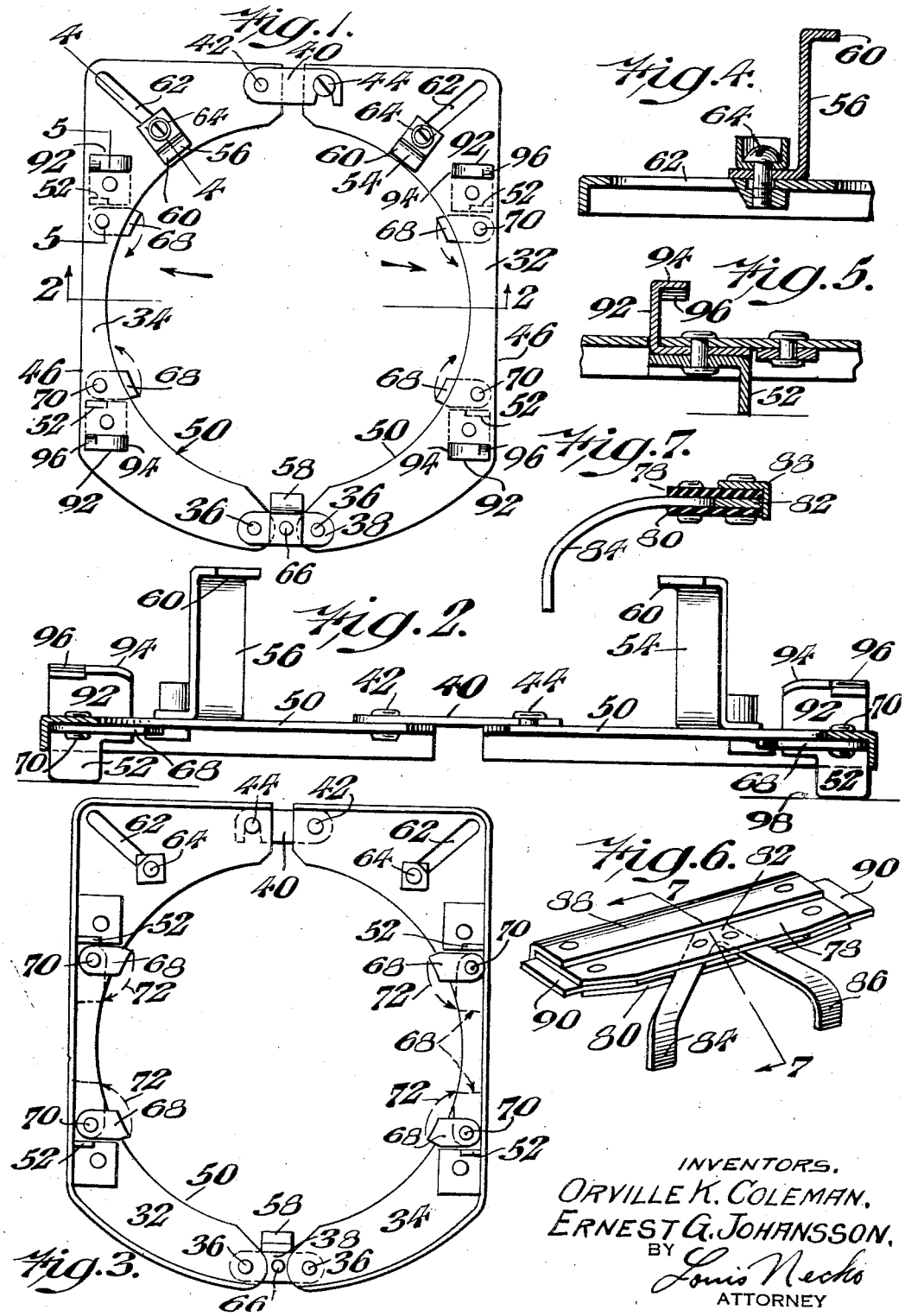
INVENTORS.
ORVILLE K. COLEMAN,
ERNEST G. JOHANSSON,
BY Louis Necho
ATTORNEY

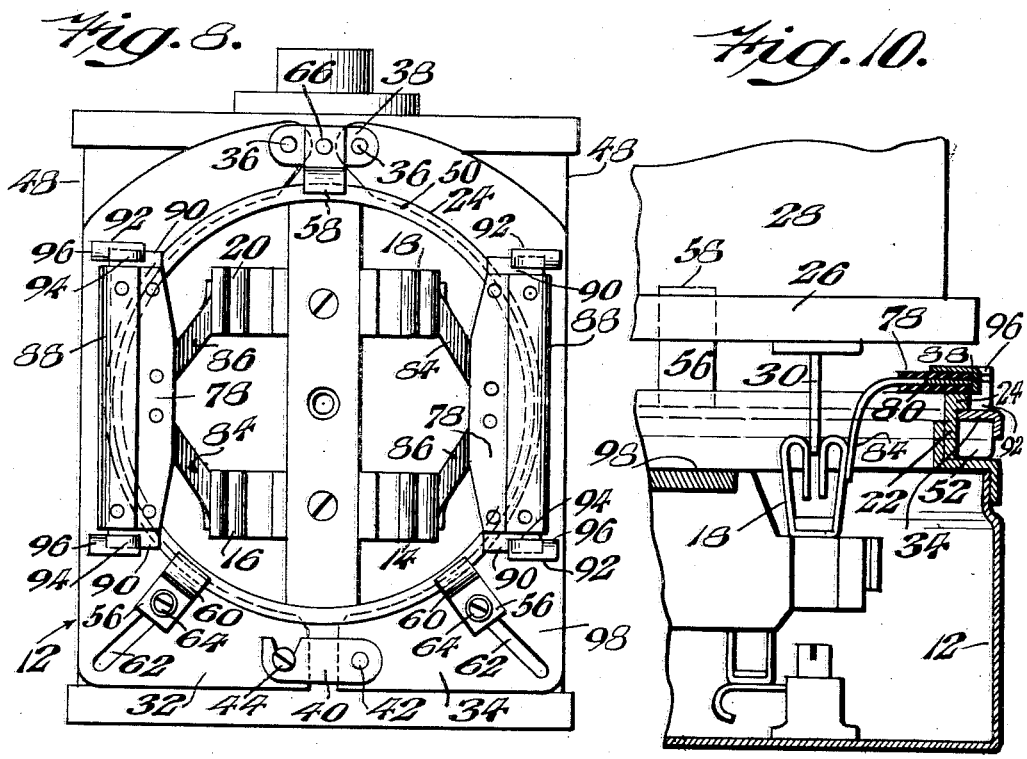
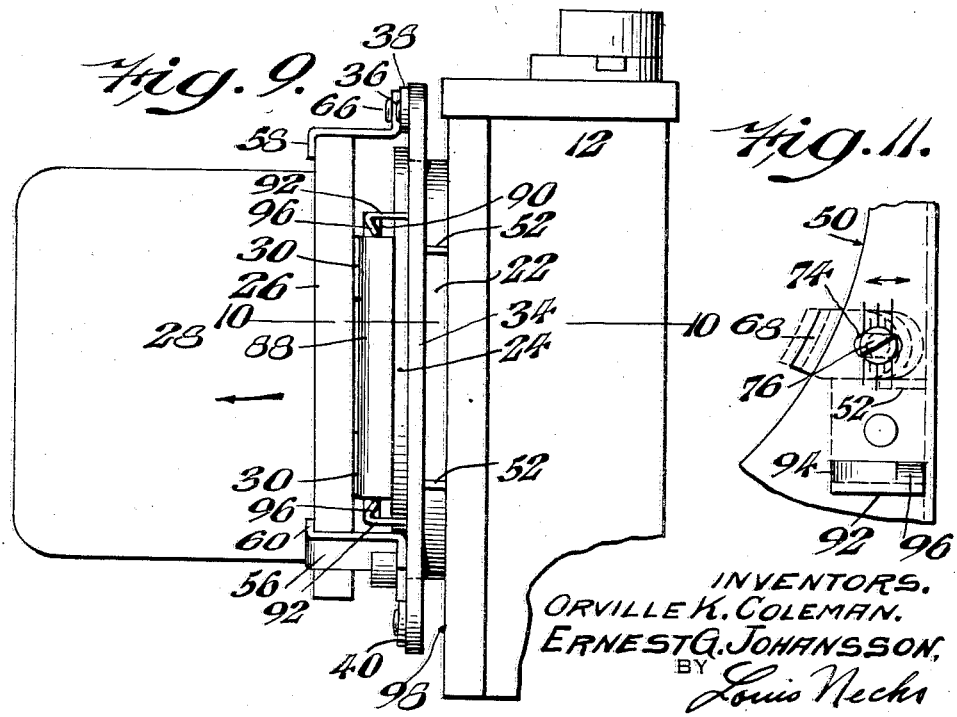

Dec. 26, 1939.  E. G. JOHANSSON ET AL  2,184,840
APPARATUS FOR BY-PASSING SOCKET METERS
Filed March 3, 1939  3 Sheets-Sheet 3

INVENTORS.
ORVILLE K. COLEMAN.
ERNEST G. JOHANSSON.
BY
Louis V lechs
ATTORNEY

Patented Dec. 26, 1939

2,184,840

UNITED STATES PATENT OFFICE 2,184,840

APPARATUS FOR BY-PASSING SOCKET METERS

Ernest G. Johansson, Watertown, Mass., and Orville K. Coleman, Mineola, N. Y.

Application March 3, 1939, Serial No. 259,620

16 Claims. (Cl. 175—222)

Socket, or back-connected meter installations, have recently come into extensive use and are becoming increasingly more prevalent. Such installations comprise a socket or housing having spring contacts or clips connected to the service lines and other contacts or clips connected to the load lines, together with a meter having prongs for engaging said contacts or clips and thus electrically connecting said service lines to said load lines and also measuring the current consumed. All meters must be tested at stated intervals and it is sometimes necessary to test or even change such meters at other than the stated intervals. To do this it has heretofore been the practice completely to remove the meter from its socket thus interrupting the service and causing great inconvenience to the customer.

It is therefore the object of our invention to devise means for safely by-passing a socket meter by means of which all interruption of service is avoided and to that end we have discovered that a socket meter can be partly withdrawn from its socket and a suitable by-pass can be applied to the service and load contacts of the socket before the meter is disconnected from the circuit. However, due to the fact that the spring clips or contacts of the socket rather tightly engage the prongs of the meter we have found that it is difficult to pull the meter out of its socket far enough to permit the insertion of a by-pass without completely withdrawing the meter from the socket and thus interrupting the service, for the reason that a pull strong enough to start the prongs of the meter moving out of the firmly engaging spring clips of the socket cannot be conveniently stopped part way with the result that the meter is entirely disconnected and the current is interrupted.

It is therefore the object of our invention to provide a by-passing apparatus which includes means capable of being applied to a meter assembly and which, when so applied, will permit withdrawal of the meter from the socket to a limited extent which, while sufficing for the insertion of a by-pass, nevertheless positively prevents complete disconnection of the meter from the socket until after the by-passing device has been properly installed to insure continued service, whereupon, by manipulating the apparatus, the meter can be completely disconnected without interfering with the action of the by-passing device and, conversely, the meter can be again partially connected to the socket so as to be in a position to resume transmitting and measuring current, before the by-passing device is removed.

Our invention further relates to an apparatus of this character which is inexpensive to make, light for the operator to carry from one operation to another, and one which, while adjustable to sockets and meter rings of various sizes, is nevertheless so simple in its construction and operation as to be highly efficient and expeditious.

Other novel features of construction and advantage will be more clearly understood from the following specification and the accompanying drawings in which:

Fig. 1 represents a top plan view of the connector ring or adaptor forming part of our invention.

Fig. 2 represents, on an enlarged scale, a section on line 2—2 of Fig. 1.

Fig. 3 represents a bottom plan view of Fig. 1.

Fig. 4 represents, on an enlarged scale, a section on line 4—4 of Fig. 1.

Fig. 5 represents a section on line 5—5 of Fig. 1.

Fig. 6 represents a perspective view of the by-passing device adapted to cooperate with the connector ring or adaptor shown in Fig. 1.

Fig. 7 represents, on an enlarged scale, a section on line 7—7 of Fig. 6.

Fig. 8 represents a top plan view of the connector ring or adaptor of Fig. 1, together with the by-passing device of Fig. 6, the same shown assembled on a meter-receiving socket with the meter removed.

Fig. 9 represents a side elevation of a socket meter assembly with the meter slightly pulled out of the socket but not entirely disconnected showing our invention applied and in actual use.

Fig. 10 represents a fragmentary section on line 10—10 of Fig. 9.

Fig. 11 represents a top plan view of a portion of the connecting ring or adaptor of Figs. 1 and 2 showing a slightly modified form of adjustment.

Figure 12:
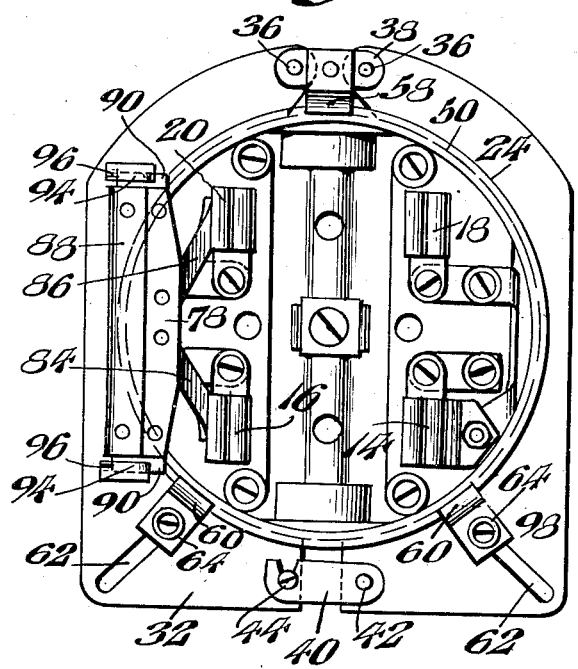
Fig. 12 represents a view similar to Fig. 8 showing our invention applied to a form of socket differing somewhat from the form of socket illustrated in the previous figures.

Referring to the drawings in which like reference characters indicate like parts, and more particularly to Figs. 8 to 10, 12 designates a meter socket which is in the nature of a housing enclosing suitable terminal connectors for the service and load lines which terminate in the spring contacts 14, 16, 18 and 20. The housing 12 may be round, square, or of any other desired type, and may be a single unit, or may be part of a row of interconnected units, and, inasmuch as the housing 12 as well as the means for connecting the service wires to the load wires are not a part of the present invention and are well known and used, it is not deemed necessary to show them or describe them in further detail. It is merely necessary to point out that all housings of this character are provided with an annulus 22 which is flanged outwardly as at 24 and against which the back or bottom ring 26 of the meter 28 is adapted to abut when the meter is in operative position with respect to the socket. A conventional sealing ring is then applied to the annulus 22 and ring 26 of the meter to prevent tampering therewith. Also, it is pointed out that since the meter or the like forms no part of the present invention, and since it can be of any desired conventional make or type, it is not shown in detail and it is merely pointed out that the socket meters of this type are provided with any desired number of contact prongs 30 for engaging the spring contacts 14, 16, 18 and 20 respectively, one such contact prong 30 being shown engaging one of the spring contacts 14 or 16 or 18 or 20 in Fig. 10.

Our invention, generally speaking, resides in two parts, one, the connecting ring or adaptor shown in Figs. 1, 2 and 3, and two, the by-passing device proper illustrated in perspective in Fig. 6. The first part of our invention, namely, the connecting ring or adaptor, consists, generally speaking, of two halves 32 and 34 which are hinged or pivoted at 36 to the connecting link 38. The other ends of the members 32 and 34 are provided with the latch 40 pivoted to one end at 42 and adapted to engage a set screw 44. Thus, the members 32 and 34 and their adjuncts can be swung away from each other in the direction of the arrows in Fig. 1 about the pivots 36 to any desired extent and can be brought back to the closed position shown in Figs. 1 and 2 and latched. While we have shown the parts 32 and 34 of the adaptor as being hinged to the link 38 so as to swing in a horizontal plane about the vertical axes of the pivots 36, it is within the scope of our invention to hinge the parts 32 and 34 so that they fold one upon the other in book fashion, or otherwise so to connect the parts 32 and 34 as to be able to assume the position shown in Fig. 8 and at the same time be capable of assuming the maximum compact position when not in use. The adaptor, as shown in Fig. 1, may be provided with the straight edges 46 which, when registering with the corresponding edges 48 of the housing 12 will indicate proper alignment of the adaptor with respect to the housing. However, if the adaptor formed of the parts 32 and 34 is to be used in connection with a meter socket of a non-rectangular shape, we can provide the adaptor with a marking which will indicate the position the adaptor must assume in order to effect proper alignment. As shown, the inner edges of the members 32 and 3b are arcuate as at 50 in order to hug the outer wall of the annulus 22 and to engage the underside of the flange 24 as best seen in Fig. 10. On the underside of the members 32 and 34 are provided the lugs or feet 52 which are of a height substantially equal to the height of the annulus 22 so as automatically to raise the arcuate edges 50 of the members 32 and 34 into engagement with the flange 24. This is desirable especially in multiple trough installation where the sockets are mounted close together thus not leaving sufficient room for the operator to insert his hand in order manually to engage the edges 50 with the underside of the flange 24. On the upper surface of the members 32 and 34 are provided the lugs 54, 56 and 58 which have their upper ends inwardly deflected as at 60. The lugs 54 and 56 are movable in the slots 62 and are tightened in position by the set screws 64 while the lug 58 is pivoted at 66 to the link 38 so as to be able to turn about its axis without being radially movable. Inasmuch as the annulus 22 is made in different sizes, and in order to adapt our connector to all sizes, we have provided on the underside of the members 32 and 34 the lugs 68 which are pivoted at 70 so as to be swingable in the direction of the arrows 72 to occupy either the position shown in solid lines in Fig. 3 or the position shown in dotted lines in the same figure. Thus, if the opening defined by the arcuate edges 50 is enough to make a tight fit around the annulus 22, the lugs 68 are swung into the position shown in dotted lines in Fig. 3 to be out of the way, and, if the annulus 22 is of smaller size, the lugs 68 are swung into the position shown in full lines in Fig. 3 in order to engage the flange 24.

In Fig. 11 we have shown a top plan view of a portion of one of the members 32—34 which would coincide with one of the lugs 68 to show a different form of adjustment in which, instead of pivoting the lugs 68 as at 70, we provide the slot 74 which is engaged by the set screw 76 and by means of which the lug 68 can be moved in or out in the direction of the arrow in Fig. 11 so as to make its effective edge assume any of the positions shown in solid or in dotted lines in Fig. 11 or by means of which the lugs 68 can be retracted to the right of Fig. 11 until their inner or effective edges are flush with the arcuate edges 50. In this way a graduated adjustment is possible which will adapt the connector formed of the members 32 and 34 for engagement with more than the two conventional sizes of the annulus 22 now in use. On this connection it is pointed that, while only two forms of adjustment have been shown, it is within the scope of our invention to employ other means for varying the size of the opening defined by the arcuate edges 50.

In Fig. 6 we have shown in perspective view a desirable form of by-passing device which comprises a pair of insulating plates 78 and 80 between which is secured the base 82 of a forked prong having the arms 84 and 86. A suitable handle or reinforcing plate 88 is suitably secured to the assembly and, either as a part of the plate 88 or as separate pieces, are the end plates 90 for engaging the clips 92 provided on the upper side of the members 32 and 34. It will be noted that the clips 92 are provided with two stepped or offset effective portions 94 and 96 which facilitate the insertion of the by-passing device and serve to retain it in position as best seen in Figs. 8 and 10. Our completely assembled device is shown applied to the socket of a meter but with the meter removed in Fig. 8, and it is shown in actual operation in Fig. 9.

While the arcuate edges 50, as well as the effective edges of the lugs 68 as shown in Figs. 3 or 11, serve to engage the flange 24 of the annulus 22, it is pointed out that an important function of the edges 50 and the lugs 68 is to hug the annulus 22 and thus insure proper and uniform spacing of the adaptor with respect to the contacts 14, 16, 18 and 20 thus in turn insuring proper engagement of the by-pass of Fig. 6 with said contacts in the manner shown in Fig. 10. Thus, even if the edges 50 or the lugs 68 were of a size to engage the flange 24, but if they were to have no relation with respect to the center of the socket or the center of a circle drawn through the contacts 14, 16, 18 and 20, there would be no way of determining whether or not the device of Fig. 6 when properly inserted in position as shown in Fig. 10 would make the perfect contact it should make with the contacts 14, 16, 18 and 20. In other words, the arcuate edges 50 and the effective edges of the adjustment lugs 68 produce a concentric relationship which facilitates the operation and insures perfect performance.

The operation is as follows:

With the meter 28 mounted on the socket or housing 12 the prongs 30 are engaged in the spring contacts 14, 16, 18 and 20 and the bottom ring 26 of the meter is normally resting on top of the flange 24 of the annulus 22 which is secured to or forms part of the socket of the housing 12. When it is desired to insert the by-passing device shown in Fig. 6, and, in order to insure against complete detachment of the meter 28 from the socket 12, the adaptor shown in Figs. 1 and 2, with the latch 40 disengaged and with the members 32 and 34 spread apart, is placed on top of the socket 12 with the lugs 52 thereof resting on the top surface 98 of the socket 12. In this position the arcuate edge 50 (with the lugs 68 withdrawn into their inoperative position or projecting inwardly either as shown in Figs. 1 and 2 or in Fig. 11, depending on the size of the annulus 22) will engage the flange 24 when the members 32 and 34 are brought together and locked with the latch 40. In other words, in this position the adaptor formed of the members 32 and 34 cannot be moved away from the socket 12. The fixed lug 58 is then turned around to overhang the upper edge of the ring 26 and the movable lugs 54 and 56, which, in the inoperative position are pushed back towards the outer ends of the slots 62, are now moved inwardly radially as far as they will go and the set screws 64 are tightened. In this position the lugs 54 and 56 also overhang the upper edge of the meter ring 26. With the parts in this position the operator grasps the meter 28 and pulls away from the socket 12 or in the direction of the arrow in Fig. 9, but is unable completely to detach the prongs 30 of the meter from the spring contacts, since the movement of the meter away from the socket is limited by the deflected ends 60 which now engage the ring 26 of the meter as shown in Fig. 9. This creates a space between the adaptor or the flange 24 and the bottom ring 26 of the meter through which the by-passing device of Fig. 6 is inserted so that the prongs 84 and 86 thereof will contact two of the spring contacts 14 and 18 while the prongs of another by-passing device inserted from the opposite direction will engage the spring contacts 16 and 20 as best illustrated in Figs. 8 and 10. In this way the current is shunted from the service lines to the load lines through the by-passing devices and independently of the meter or its terminals although it will be noted that, when the by-passing device has reached its innermost position and is fully in engagement with the spring contacts 14, 16, 18 and 20, the prongs 30 of the meter are still engaging the same contacts. When this has been done, the pivoted lug 58 may or may not be turned around so as to disengage from the ring 26 of the meter 28 and the lugs 54 and 56, released by disengaging the screws 64, are then pushed radially outwardly in the slots 62 so as to disengage from the ring 26. The adaptor itself, however, remains in position and so does each of the by-passing devices shown in Fig. 6. The meter 28 can now be completely withdrawn without arcing and the supply of current from the service to the load lines will not be interrupted. When the necessary repair, testing, changing or other operation is completed, the meter is again put in position and pushed in as far as it will go which will insure the contact prongs 30 engaging the spring contacts 14, 16, 18 and 20 as shown in Fig. 10, whereupon the latch 40 is disengaged and the adaptor shown in Fig. 1 and the by-passing devices shown in Fig. 6 are removed. The meter is then pushed in until the bottom ring 26 rests against the flange 24 and is locked or otherwise sealed in place in any desired manner.

It will be noted that each of the members 32 and 34 is provided with two juxtaposed lugs 92 under the overhanging deflected ends of which the end plates 90 of the by-passing devices are adapted to slide and by means of which the by-passing devices are retained firmly in position. Thus, the end plates 90 are first inserted under the lower portions 96 and then one end plate 90 is first pushed under one of the higher portions 94 and the other end plate 90 is then pushed under the corresponding higher portion 94 of the juxtaposed lug 92. The passing of the end plates 90 one after the other under the corresponding lower portions 96 of the overhanging edges of the plates 92 exerts pressure against the spring prongs 84 and 86 so that, when the ends 90 are successively pushed further inwardly so as to pass from under the lower portions 96 to a position under the higher portions 94 of the lugs 92, the pressure of the spring prongs 84 and 86 cause the end plates 90 of the by-passing device to snap upwardly and cause a clicking sound which indicates to the operator that the adaptor of Fig. 6 is adequately and firmly engaged in position. Furthermore, when the end plates 90 have been pushed inwardly far enough to come under the higher portions 94, it will be seen that the lower portions 96 of the overhanging edges of the lugs 92 will serve as back-stops to prevent retroactive or outward movement of the by-passing devices shown in Fig. 6. It follows that if it is desired to remove one or both of the by-passes without dismantling the adaptor shown in Fig. 1 it will be necessary to depress the outer rear edges of the plates 96 against the tension of the prongs 84 and 86 until the end plates 90 have cleared and passed outwardly under the lower portions 96 of the overhanging edges of the lugs 92. The by-passing devices can then be withdrawn while the adaptor, formed of the parts 32 and 34, is still tightly clamped about the annulus 22. In actual practice the mere disengagement of the adaptor by disconnecting the latch 40 and loosening the screws 64 to push the lugs 54 and 56 away from the ring 26 of the meter automatically loosens and disengages the by-passing devices.

It will thus be seen that we have devised a novel means for by-passing a back-connected or socket meter without interruption of service and without the danger and damage of arcing, and that, not only have we accomplished that, but we have also provided novel and practical means for putting our invention in practice. As far as we are aware we are the first to solve this problem and to produce means which, while inexpensive to produce and of practically unlimited durability, can be almost instantaneously applied to a socket meter installation and which, when so applied, will insure against any possibility of the meter being accidentally disconnected from the circuit before the current is by-passed, and it will also be seen that we have devised a novel by-passing device which can be used in connection with the adaptor ring which limits the range of withdrawal of the meter or which can be used independently by being inserted into by-passing position and then suitably clamped to the meter housing or socket 12. It will also be seen that the apparatus embodying our invention is capable of being practically automatically, and with the exercise of no special skill, perfectly and instantaneously aligned in proper concentric relationship to insure the proper application and engagement of the by-passing device of Fig. 6 in position as shown in Fig. 10.

We have found, in actual practice, that no precision is necessary in the manufacture of the entire apparatus and particularly the guiding and retaining clips 32 since the spring character of the prongs 34 and 36 enables the by-passing device of Fig. 6 properly to engage the contacts 14, 16, 18 and 20 within more than the usual range of mechanical tolerances ordinarily provided. Also we have found that no special skill or exactitude is required in forcing the by-passing device of Fig. 6 into its operative position for the reason that if the by-passing device is presented to the adaptor in parallel position or within a range of 10 degrees more or less from the parallel it can readily be inserted and will properly engage the contacts 14, 16, 18 and 20 within the socket.

The interruption of the service to the customer, even though only momentary, is of great inconvenience in that it stops electric clocks and otherwise interferes with the operation of electrical appliances, and it will be seen that by our invention this disadvantage is completely obviated, and that the meter can be removed for testing or replacement without any interruption. We are aware that in order to overcome this difficulty it has been the practice to equip socket meters with built-in, automatic, spring-actuated, contact devices which are inoperative when the prongs of the meter are in engagement with the terminals of the socket but which are adapted to interconnect the terminals automatically when the prongs of the meter have been withdrawn but this construction not only adds to the expense of manufacture and assembly of each individual socket but has also been found not to be thoroughly reliable, since, in the event of any failure, the current will be by-passed from the service to the load lines without being measured by the meter, which loss will continue until discovered because of complete absence or uniformly low current consumption reading on the meter. Also this construction does not lend itself to checkup or inspection due to the fact that the automatic shunting device is not accessible when the meter or other instument is in position and when the meter is removed the shunting device automatically goes into operation so that there is no way of determining whether or not the automatic shunting device is in operation when the meter is in position, during which time the shunting device is required in its inoperative position. For this and other reasons the built-in shunting device has been found objectionable by the majority of meter technicians and users. By our invention, not only do we provide a device which cannot fail since it is neither built-in nor "automatic" in its operation, but we also reduce the cost of meter installations since one of our devices can be carried from one meter to another so that a very great number of meters can be serviced with our apparatus and thus the additional cost of building in a shunting device in each socket is saved.

It will also be noted that our shunting apparatus, consisting as it does of the adaptor formed of the parts 32 and 34 and the shunting device of Fig. 6, is very light, compact and portable so that it can be carried by the meter tester in his tool kit.

With respect to the adaptor device, while we have shown the inner edges 50 as arcuate for concentric engagement with the annulus 22 of the socket, it is to be understood that this is done only for convenience and that the inner edges 50 can be arcuate, hexagonal, rectangular, or any other shape which would permit of adjustment and which would have a concentric relationship with respect to the terminals of the socket so that, once the members 32 and 34 are clamped around the socket, the guides 92, which serve to position the shunting devices of Fig. 6, will be in such a position that, when the shunting devices are applied, they will automatically make proper contact with the terminals within the socket.

When reengaging the meter with the socket from which it has been removed, it is preferable, after the meter has been inserted as far as it will go and the prongs thereof are in contact with the socket terminals, again to apply the clamps 54, 56 and 58 in their engaging position so as to hold the meter in position and insure against its accidental disengagement while the by-passing devices of Fig. 6 are being removed, and, after the by-passing devices have been removed, the meter can be pushed in until it reaches its original, normal, and completely engaging position, whereupon the latch 49 can be disengaged and the adaptor members 32 and 34 can be removed.

Figure 14:
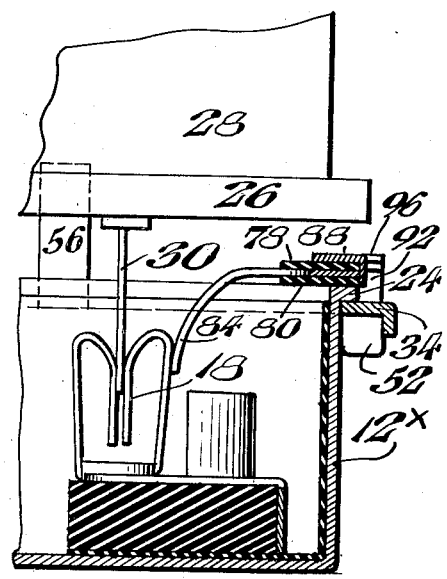
Fig. 14 is a view similar to Fig. 10 taken on line 14—14 of Fig. 13.
Figure 13:
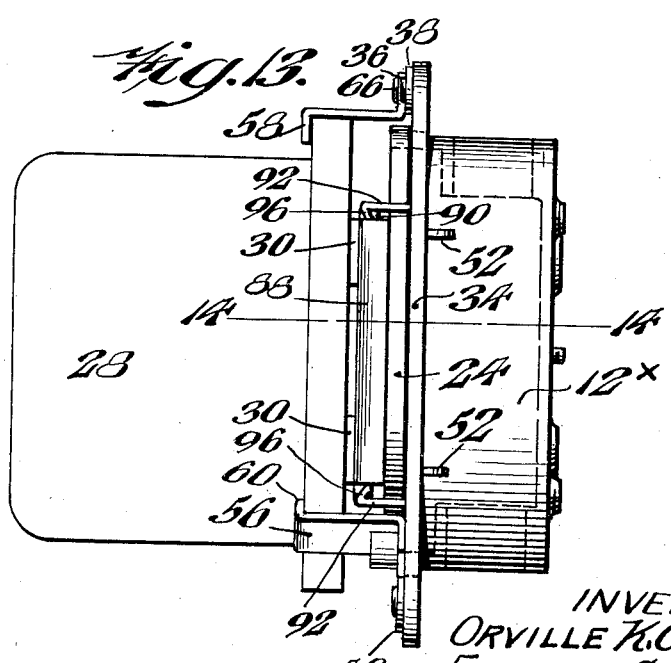
Fig. 13 represents a view similar to Fig. 9 showing the application of our invention.

In Figs. 12 to 14 we have shown the devices of Figs. 1 and 6 applied to another type of meter socket which is now in use and which consists of the cylindrical trough or body 12x within which are mounted terminal blocks which carry service and load clips 14, 16, 18 and 20 which are adapted to be engaged by contact prongs 30 of the meter or other instrument 28. In Fig. 14 only one of the prongs is shown as engaging one of the service or load clips. The cylindrical trough 12x is provided with the flange 24 which is adapted to form a seat for the bottom or back ring 26 of the instrument 28 in the usual manner. In this construction the feet or legs 52, on the underside of the adaptor 32—34, do not serve any useful purpose because in this construction there is room enough for the operator to insert his hand and draw the adaptor parts 32 and 34 up against the underside of the flange 24. Since the same shunting device of Fig. 6 and adaptor of Figs. 1 and 2 are used on the cylindrical trough 12x, and since they are applied, removed and otherwise operated in the same manner as hereinabove described, it is not deemed necessary to reiterate the operation of this device as described in connection with Figs. 1 to 11. It is however necessary to point out that, whereas the straight edges 46 of the adaptor serve, when the adaptor is applied to a rectangular socket, to align the adaptor with respect to the socket, they serve no such purpose when the adaptor is applied to the cylindrical socket 12x, and therefore it is desirable to provide means for indicating the proper alignment or registration of the adaptor with respect to the cylindrical socket and to this end a mark can be placed on the body of the socket 12x which, when registering with the pivot 66, for instance, or the center of the latch 40, or another mark placed on some suitable part of the adaptor parts 32 or 34, would indicate that the adaptor is in proper position to receive the shunting devices of Fig. 6 in such a manner as to insure proper engagement with the load and service spring clips 14, 16, 18 and 20.

While we have shown but one form which our invention may assume, we wish to point out that we are aware that various changes in the details of construction can be made without departing from the spirit or scope of our invention and that we claim the invention not only as illustrated in the drawings and described in the specification but also as defined in the appended claims and their broad equivalents.

Having thus described our invention, what we claim as new and desire to secure by Letters Patent is:

1. A portable attachment of the character stated comprising a member attachable to the socket element of a socket-meter installation, and a stop carried by and projecting beyond the plane of said member and adapted to engage and prevent the complete withdrawal of the meter element of said installation from said socket element.

2. A portable attachment of the character stated comprising a member attachable to the socket element of a socket-meter installation, and an adjustable stop carried by and projecting beyond the plane of said member and adapted to engage and prevent the complete withdrawal of the meter element of said installation from said socket element.

3. In a device of the character stated, means attachable to the socket element of a socket-meter installation, said means including a radially adjustable stop adapted to engage and limit the withdrawal of the meter element of said installation from said socket element.

4. In a device of the character stated, means attachable to the socket element of a socket-meter installation, said means including a plurality of stops adapted to engage and prevent complete withdrawal of the meter element of said installation away from said socket.

5. In a device of the character stated, means attachable to the socket element of a socket-meter installation, said means including a plurality of radially adjustable stops adapted to engage and prevent complete withdrawal of the meter element of said installation away from said socket.

6. In a device of the character stated, a clamp attachable to the socket element of a socket-meter installation, a stop carried by said clamp for permitting partial but preventing complete withdrawal of the meter element from the socket element of said installation, and means for centering said clamp with respect to said socket.

7. In a device of the character stated, a clamp attachable to the socket element of a socket-meter installation, a stop carried by said clamp for permitting partial but preventing complete withdrawal of the meter element from the socket element of said installation, and means for adjustably centering said clamp with respect to said socket.

8. In a device of the character stated, a sectional annular member adapted to be clamped to the socket element of a socket-meter installation, stops carried by said annular member for engaging the meter element of said installation to permit partial but prevent complete withdrawal thereof from said socket element and adjustable lugs carried by said annular member for adapting said annular member to sockets of various sizes and for centering said annular member with respect to the electric terminals within said socket.

9. In a device of the character stated, in combination, means attachable to a socket-meter installation for permitting partial but preventing complete withdrawal of the meter element of said installation from the socket element thereof, and means insertable between said meter and socket elements for by-passing the current normally flowing through said meter.

10. A by-passing apparatus for socket meter installation comprising, an annular member attachable to the socket element of said installation in concentric relationship with respect to the service and load terminals of said socket, means carried by said annular member and adapted to engage the meter element of said installation to prevent complete withdrawal of the meter element from said socket element, and a current shunting apparatus insertible between said socket element and said meter element, when the latter has been partly withdrawn from the former, for electrically connecting the service and load terminals of said socket independently of said meter.

11. In a by-passing apparatus for socket meter installation comprising a socket element having service and load terminals therein and a meter element having prongs for engaging and electrically interconnecting said terminals, a clamp adapted to be secured to said socket in a predetermined operative position with respect to said terminals, a stop carried by said clamp for preventing complete withdrawal of said meter element from said socket element, guides carried by said clamp in predetermined operative relationship with respect to said terminals, and a current shunting device comprising a body portion adapted to be engaged by said guides, and prongs insertible between said meter and said socket for electrically interconnecting said terminals independently of said meter.

12. In a by-passing apparatus for socket meter installation comprising a socket having service and load terminals therein and a meter having prongs for engaging and interconnecting terminals, a concentrically adjustable clamp adapted to be secured to said socket in a predetermined position with respect to said terminals, a plurality of radially movable stops carried by said clamp for preventing complete withdrawal of said meter from said socket, guides carried by said clamp in operative relationship with respect to said terminals, and a current shunting device comprising a body portion adapted to be engaged by said guides, and prongs insertible between said meter and said socket for electrically interconnecting said terminals independently of said meter.

13. In a by-passing apparatus for socket meter installation comprising a socket having service and load terminals therein and a meter having prongs for engaging and interconnecting terminals, a sectional, hinged clamp adapted to be secured to said socket in a predetermined position with respect to said terminals, a plurality of radially movable hooked lugs carried by said clamp for preventing complete withdrawal of said meter from said socket, guides carried by said clamp in operative relationship with respect to said terminals, and a current shunting device comprising a body portion adapted to be engaged by said guides, and prongs insertible between said meter and said socket for electrically interconnecting said terminals independently of said meter.

14. A by-passing device for a socket-meter installation comprising a body portion adapted to be secured to said installation, and contact prongs carried by said body portion and adapted to be inserted between the socket element and meter element of said socket-meter installation when said meter element has been partially withdrawn from and spaced with respect to said socket element, electrically to connect the service and load terminals of said socket element directly.

15. A by-passing device for a socket-meter installation comprising a body portion adapted to be secured to said installation, and arcuate contact prongs carried by said body portion and adapted to be inserted between the socket element and meter element of said socket-meter installation when said meter element has been partially withdrawn from and spaced with respect to said socket element, electrically to connect the service and load terminals of said socket element directly.

16. A by-passing device for a socket-meter installation comprising a body portion adapted to be secured to said installation, and spring contact prongs carried by said body portion and adapted to be inserted between the socket element and meter element of said socket-meter installation when said meter element has been partially withdrawn from and spaced with respect to said socket element, electrically to connect the service and load terminals of said socket element directly.

ERNEST G. JOHANSSON.
ORVILLE K. COLEMAN.